D. P. EINREM.
VULCANIZER.
APPLICATION FILED JULY 26, 1915.
1,159,197. Patented Nov. 2, 1915.
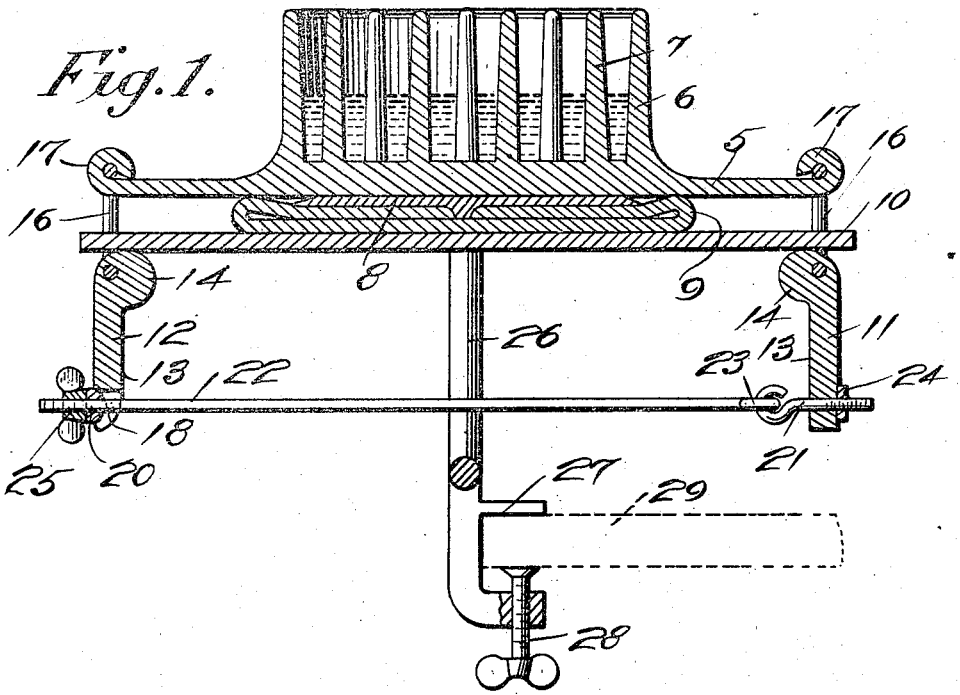
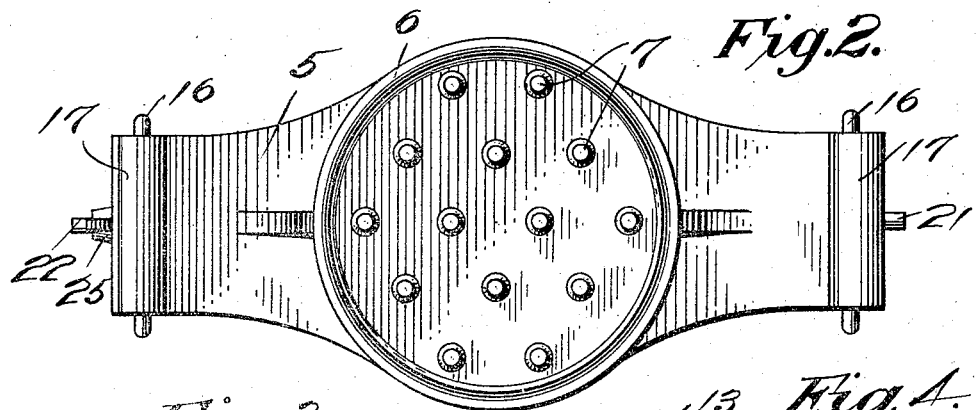
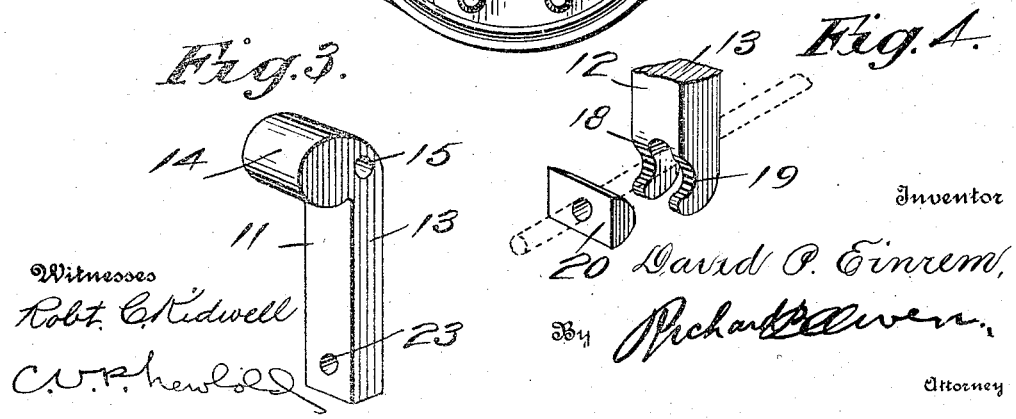
Inventor
David P. Einrem,
By Richard B. Owen,
Attorney
Witnesses
Robt. C. Kidwell
C. W. P. hewitt

UNITED STATES PATENT OFFICE.

DAVID P. EINREM, OF SPRINGFIELD, SOUTH DAKOTA.

VULCANIZER.

1,159,197.   Specification of Letters Patent.   Patented Nov. 2, 1915.

Application filed July 26, 1915. Serial No. 42,041.

*To all whom it may concern:*

Be it known that I, DAVID P. EINREM, a citizen of the United States, residing at Springfield, in the county of Bonhomme and State of South Dakota, have invented certain new and useful Improvements in Vulcanizers, of which the following is a specification.

This invention relates to vulcanizing apparatus of the type particularly adapted for the applying of patches to rubber tires or tubes.

As a principal object, it is contemplated by this invention to provide a vulcanizer which shall exert an even pressure upon the entire surface of the patch to be applied to the tire. With the use of the present day vulcanizers which are provided with a plurality of tightening means for forcing the vulcanizer against the patch, it is frequently the case that the operator will tighten one of the fasteners more than the other which has been known to result in an unequal applying of the patch, which of course, destroys its usefulness to a great extent.

Specifically then, an object of the present invention is to provide cam means adapted to control the pressure of the vulcanizer against the tire. such cam means being symmetrically related to the vulcanizer and equally operated by a single adjusting motion which distributes the pressure between the vulcanizer and the tire equally over the entire surface of the patch.

The above and additional objects which will be hereinafter more specifically treated are accomplished by such means as are illustrated in the accompanying drawings, described in the following specification, and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts: Figure 1 is a vertical sectional view taken through the vulcanizing apparatus of this invention showing the method of applying a patch to an automobile inner tube; Fig. 2 is a plan view of the same subject-matter; Fig. 3 is a view in perspective of one of the equalizing cam members, and Fig. 4 is a similar view of a portion of the other cam member.

The vulcanizing apparatus proper includes an elongated base 5 which may be cast integrally with a centrally formed basin or receptacle 6 for the fluid fuel which is burned to create the necessary heat. The basin 6 is also cast with a number of integral fingers 7 projecting upwardly from the bottom and serving to distribute the heat generated by the ignited fuel equally over the under-surface of the base 5 which is in direct contact with the patch 8 to be applied to a tire generally designated 9.

Supporting the tire is the movable plate member 10, the pressure of which against the tire it is desired to equalize in all directions as the principal function of this invention. The pressure equalizing means include cam members 11 and 12 respectively illustrated in Figs. 3 and 4. The former includes a stem or shank 13 formed at its upper extremity with an enlarged cam head 14 formed with an aperture 15 whereby the member may be linked to the base 5, rectangular links 16 being employed for this purpose loosely surrounding the plate 10 and received within the apertures 15 of the members and by the turned extremity 17 of the base plate 5.

The cam member 12 is similarly formed as regards the cam bearing portion thereof but its stem 13 is bifurcated at the lower extremity in the manner denoted by the numeral 18, one edge of these bifurcations being hollowed as shown at 19 for the reception of the semicylindrical washer 20. Bolts 21 and 22 are respectively receivable in the lower extremities of the cam members 11 and 12, passing through an aperture 23 in the former and through the bifurcation 18 of the latter. These bolts which may or may not be of the unequal length illustrated are connected by their eyed ends 23, the bolt 21 being maintained against the tensional displacement by means of a nut 24 and the bolt 22 being provided with the adjustable wing nut 25.

A U-shaped yoke 26 serves as a support for the plate 10, such yoke being equipped at its lower extremity with a projecting pressure plate 27 with which there conjunctively acts the screw 28 in maintaining the vulcanizer upon a bench, table or other suitable support indicated by the dotted lines 29 of Fig. 1.

After the tire is laid upon the plate 10 with its puncture exposed and the patch 8 loosely fitted thereon in the customary manner, the vulcanizer proper is permitted to bear against the upper surface of the patch in forcing the latter over the punctured surface of the tire. By manipulation of the nut 25 the operator can direct movement of both of the cam members 11 and 12 in such manner that the vulcanizing apparatus is forcibly drawn against the plate 10 which acts as a fulcrum for the action of the cams. By this single operating element 25 an exactly similar movement of the separate cam members is assured which, in turn, insures a distribution of pressure on the part of the vulcanizer symmetrically over the entire surface of the patch 8. The cylindrically seated washer 20 prevents any binding between the operating member 25 and the cam member 12 such as would be apt to occur if some such means as this were not employed. The fluent fuel within the vulcanizer bowl is then ignited for the generation of the necessary heat to vulcanize the soft rubber patch over the punctured tire surface.

While in the foregoing, however, there has thus been illustrated in the drawings and described in the specification such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claims.

What is claimed is:—

1. A vulcanizing apparatus including a base, a vulcanizing bowl carried thereby, a pressure plate, means for supporting the plate, and means operable upon the plate as a fulcrum for forcing the base down thereupon in a manner equalizing the pressure therebetween.

2. A vulcanizing apparatus including a base, a vulcanizing bowl carried thereby, a pressure plate, means for supporting the plate, and means separately acting upon the plate as a fulcrum but simultaneously operable by the same element to force the base upon the plate.

3. A vulcanizing apparatus including a base, a vulcanizing bowl carried thereby, a pressure plate, means for supporting the plate, and cam means separately acting upon the plate as a fulcrum but equally and simultaneously operable by a single controlling element to distribute the pressure between the base and the plate.

4. A vulcanizing apparatus including a base, a combustion bowl carried thereby, a plate, means supporting the plate, members operable upon the plate as a fulcrum, link means connecting the members and the base, and means for simultaneously and equally moving said members.

5. A vulcanizing apparatus including a base, a combustion bowl carried thereby, a plate, means supporting the plate, members operable upon the plate as a fulcrum, means linking the members with said base, and means manually operable from a single point for simultaneously and equally actuating said members to distribute the pressure between said base and said plate.

6. A vulcanizing apparatus including a base, a combustion bowl carried thereby, a plate, means for supporting the plate, cam members in contact with the plate, link means between the members and said base, bolts connected with each member and with each other, and means for manually operating one of the bolts to equally and simultaneously actuate all of the members in controlling and equalizing pressure between said base and said plate.

7. A vulcanizing apparatus including a base, a combustion bowl carried thereby, a plate, means supporting the plate, members operable upon the plate as a fulcrum, means linking the members with said base, means manually operable from a single point for simultaneously and equally actuating said members to distribute the pressure between said base and said plate, and cylindrically seated washer means preventing binding action between the last said means and said members.

8. A vulcanizing apparatus including a base, a combustion bowl carried thereby, a plate, means for supporting the plate, cam members in contact with the plate, link means between the members and said base, bolts connected with each member and with each other, means for manually operating one of the bolts to equally and simultaneously actuate all of the members in controlling and equalizing pressure between said base and said plate, and cylindrically seated washer means preventing binding action between the last said means and said members.

In testimony whereof I affix my signature in presence of two witnesses.

DAVID P. EINREM.

Witnesses:
E. B. KVANLI,
PETER M. ERICKSON.

Copies of this patent may be obtained for five cents each, by addressing the "Commissioner of Patents, Washington, D. C."